United States Patent Office 3,766,274
Patented Oct. 16, 1973

3,766,274
POLYFLUOROISOALKOXYALKYL SUBSTITUTED AMINES AND QUATERNARY AMMONIUM SALTS
Louis G. Anello, Orchard Park, and Richard F. Sweeney, Elma, N.Y., assignors to Allied Chemical Corporation, New York, N.Y.
No Drawing. Filed Oct. 22, 1969, Ser. No. 868,622
Int. Cl. C07c *93/04*
U.S. Cl. 260—584 C                    20 Claims

ABSTRACT OF THE DISCLOSURE

The compounds of the invention have the formula

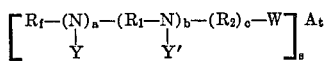

wherein $R_1$ and $R_2$ are alkylene groups, Y can be hydrogen or an alkyl, Y' can be hydrogen, alkyl or hydroxyalkyl, W is a quaternary ammonium radical having A as an accompanying anion, or W is a tertiary amine radical, and $R_f$ is a polyfluoroisoalkoxyalkyl radical of the formula

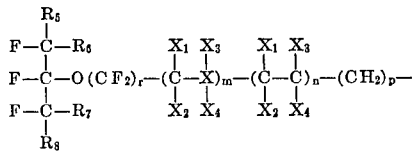

wherein $R_5$–$R_8$ can be fluorine, chlorine, or perhaloalkyl, $X_1$–$X_4$ independently can be hydrogen, fluorine, chlorine or bromine, r is an integer from 1–2, m and n are integers from 0–20, and p is an integer from 0–1. These compounds are surface active agents and can impart oil and water repellent properties to textiles.

SUMMARY OF THE INVENTION

The compounds of the invention have the formula

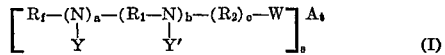   (I)

wherein
(a) $R_f$ is a polyfluoroisoalkoxyalkyl radical of the formula

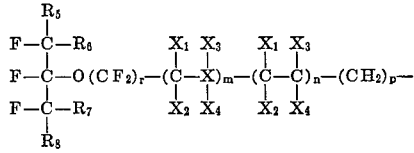

wherein
(i) $R_5$–$R_8$ can be independently selected from the group consisting of fluorine, chlorine, and perhaloalkyl groups of 1 to 10 carbon atoms, or when taken together $R_5$–$R_8$ may form a perhalocycloalkyl structure, the halo portions of $R_5$–$R_8$ being fluorine or chlorine, with the provisos that each carbon atom of $R_5$–$R_8$ contain at least one fluorine atom, no more than three of $R_5$–$R_8$ are perhaloalkyl groups, $R_5$ and $R_6$ cannot both be chlorine and $R_7$ and $R_8$ cannot both be chlorine, preferably $R_5$–$R_8$ are fluorine or perfluoroalkyl groups of 1 to 3 carbon atoms.

(ii) $X_1$–$X_4$ independently can be hydrogen, fluorine, chlorine or bromine, provided that each $X_1$–$X_4$ group does not include more than two chlorine atoms or one bromine atom, and when $X_1$ and $X_3$ independently are each hydrogen or fluorine, each of $X_2$ and $X_4$ independently may be $CF_2R_9$ wherein $R_9$ is an alkyl or haloalkyl radical of 1 to 8 carbon atoms in which the halogen atoms are fluorine, chlorine or bromine, the $(X_1X_2C—CX_3X_4)_m$ and $(X_1X_2C—CX_3X_4)_n$ moieties may be the same or different; preferably $X_1$–$X_4$ are hydrogen, fluorine, or chlorine.

(iii) r is an integer from 1–2, m and n are integers from 0–20, the sum of m and n is 0–20, preferably m and n are 0–10, p is an integer from 0–1, with the proviso that when p is 0, n must be at least one and $X_3$ and $X_4$ in the $(X_1X_2C—CX_3X_4)_n$ moiety must be hydrogen.

(b) $R_1$ independently at each occurrence is an alkylene group, straight chain or branched, of 1–6 carbon atoms.

(c) $R_2$ is an alkylene group, straight chain or branched, of 1–20 carbon atoms, preferably 1–6 carbon atoms.

(d) Y can be hydrogen or an alkyl of 1–6 carbon atoms.

(e) Y' independently at each occurrence can be hydrogen, alkyl or hydroxyalkyl of 1–6 carbon atoms, acyl of the formula

wherein $R_f$ has the aforesaid meaning, or

wherein $R_1$ and Y have the aforesaid meanings and B can be hydrogen, alkyl of 1–6 carbon atoms, or acyl of the formula

wherein $R_f$ has the aforesaid meaning, preferably Y' is hydrogen or alkyl of 1–6 carbon atoms.

(f) W is a quaternary ammonium radical of up to 12 carbon atoms wherein all chemical bonds of the quaternized nitrogen are single bonds and A is an accompanying anion, or W is a tertiary amine radical of the formula

wherein $R_3$ and $R_4$ independently can be hydrogen, alkyl or cycloalkyl of 1–6 carbon atoms, hydroxyalkyl of 1–6 carbon atoms, or aryl of 6–9 carbon atoms, or $R_3$ and $R_4$ can be joined to form a heterocyclic structure of up to 6 carbon atoms; with the proviso that only one of $R_3$ and $R_4$ can be cycloalkyl or aryl; preferably $R_3$ and $R_4$ are hydrogen or alkyl of 1–6 carbon atoms.

(g) a and c are integers from 0–1 and b is an integer from 0–20, preferably from 0–6, with the proviso that when a is 0, b and c are 0; t is an integer from 0–1 and s is an integer from 1–3 with the proviso that when W is a tertiary amine radical, t is 0 and s is one, and when W is a quaternary ammonium radical, t is one and s is an integer from one up to the negative charge of A.

This invention is not meant to encompass compounds in which the quaternized nitrogen atom is included in an aromatic ring. Thus W is not pyridinium, quinolinium, and the like.

The criticality in the structure of the above described compounds is in the polyfluoroisoalkoxyalkyl tail portion of the molecule wherein an ether oxygen atom links a fluorinated carbon atom attached to two fluoroalkyl groups and at least one —$CF_2$— group.

It has been found that the novel compounds of this invention are useful as surface active agents in that they decrease the surface tension of aqueous solutions and of many organic solvents. The compounds can impart oil and water repellent properties to textiles. They also find use as leaving agents in wax formulations, for forming stable water in hydrocarbon emulsions, and when dissolved in water they form fire extinguishing agents for hydrocarbon type fires.

DETAILED DESCRIPTION

The quaternary ammonium salts are prepared by reacting the polyfluoroisoalkoxyalkylamines of this invention with an organic or mineral acid or other quaternizing agent, as hereinafter described. The amines, in turn, may be prepared by one or more of the following methods:

(1) A polyfluoroisoalkoxyalkyl nitrile is reduced in the presence of a conventional reduction catalyst such as $LiAlH_4$, as follows:

$$\begin{array}{c} R_5 \\ | \\ F-C-R_6 \\ | \\ F-C-O(CF_2)_r(X_1X_2C-CX_3X_4)_m(X_1X_2C-CX_3X_4)_nCN + LiAlH_4 \longrightarrow \\ | \\ F-C-R_7 \\ | \\ R_8 \end{array}$$

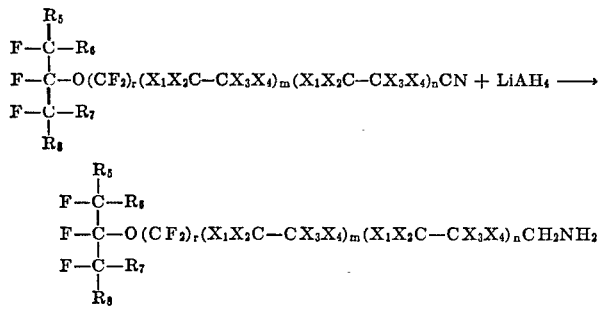

(2) A polyfluoroalkoxyalkyl iodide is reacted with an alkenyl cyanide and the resultant product is then reduced in the presence of a conventional reduction catalyst such as $LiAlH_4$. An example of such reaction is as follows:

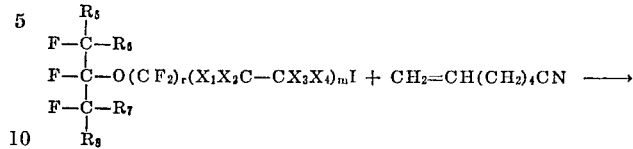

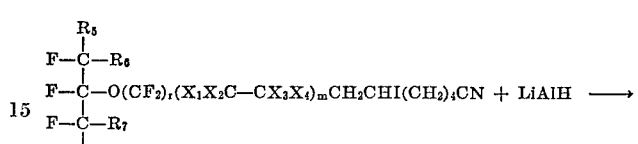

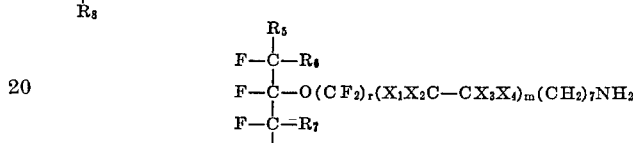

(3) A polyfluoroalkoxyalkyl iodide is reacted with an alkenylamide and the resultant product is then reduced with a conventional reduction catalyst such as $LiAlH_4$. An example of such reaction is as follows:

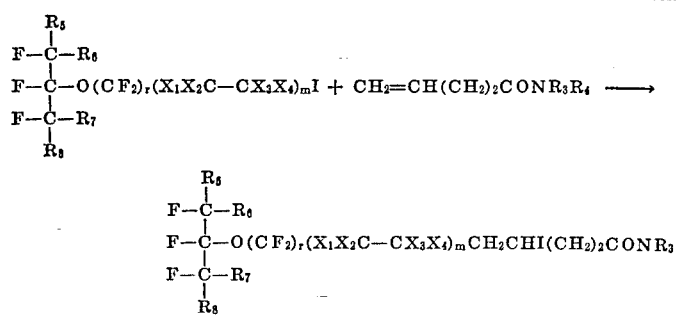

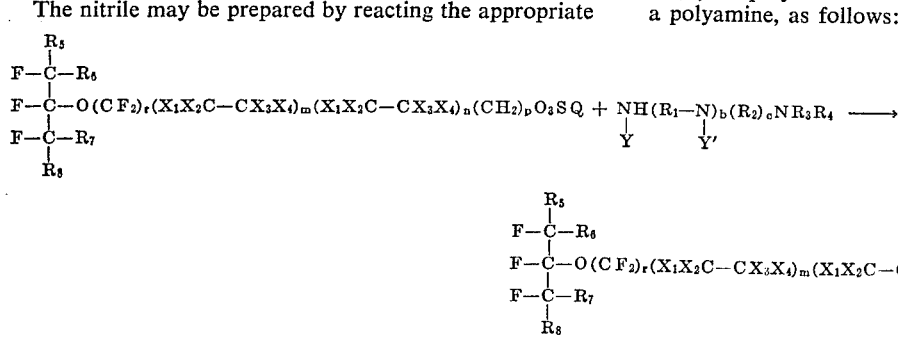

The reaction is preferably run at 30 to 100° C. for from 6 to 12 hours.

The nitrile may be prepared by reacting the appropriate

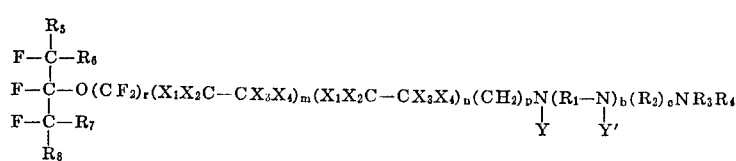

The reaction is preferably run at 30 to 100° C. for from 6 to 12 hours. In the above reaction, $R_3$ and $R_4$ may be joined to form a non-aromatic, heterocyclic structure.

(4) A polyfluoroalkoxyalkyl sulfonate is reacted with a polyamine, as follows:

iodide with a metallic cyanide such as potassium or sodium cyanide as follows:

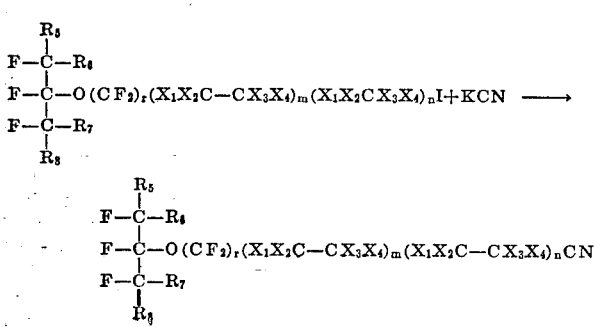

wherein Q is an alkyl or aryl. The reaction is preferably run at 80 to 125° C. for from 10 to 24 hours. In the above reaction, $R_3$ and $R_4$ may be joined to form a non-aromatic, heterocyclic structure.

Suitable polyamines are well known and include for example 3-(N,N-dimethylamine) propylamine, 2-(N,N-dimethylamino) - ethylamine, N,N,N-triethylethylenediamine and the like. The sulfonate may be prepared by reacting the corresponding alcohol with alkyl or aryl chloride in the presence of a base. The alcohols in turn may be prepared by the methods disclosed in copending U.S. application Ser. No. 721,089 filed Apr. 12, 1968, now abandoned, the pertinent subject matter of which is hereby incorporated by reference. Essentially the alcohol starting material may be prepared by reacting $SO_3$ with the corresponding iodides of the formula

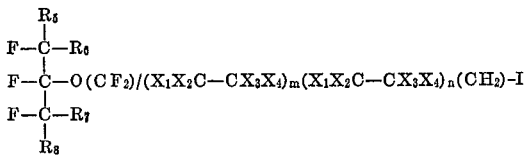

to produce the corresponding polysulfates, followed by hydrolysis of the polysulfate with 35–50% $H_2SO_4$ at about 100° C. to the desired alcohol.

The polyfluoroisoalkoxyalkyl iodides used in methods (1)–(4) above, and the preparation thereof, are disclosed in copending application Ser. No. 633,359, filed Apr. 25, 1967, now U.S. Pat. 3,514,487, and in corresponding Belgian Pat. 714,162, the pertinent subject matter of both being hereby incorporated by reference. Essentially, these iodides, referred to as telomers in the above application and patent, may be prepared by telomerizing telogens of the formula

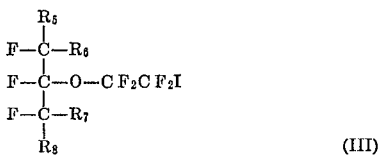

wherein $R_5$, $R_6$, $R_7$ and $R_8$ are as indicated above. The reaction of the telogens of Formula III with a suitable telomerizable unsaturated material will give repeating units of the radical —$(X_1X_2C—CX_3X_4)$— in the molecule. For example

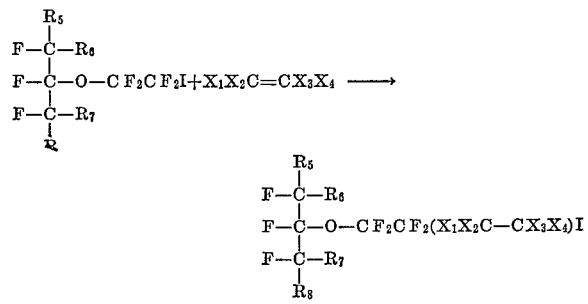

The longer chain iodide starting materials where $r$ equals one are telomers which may be prepared by the following procedure:

The polyfluoroisoalkoxyalkyl iodide telogen of Formula III is reacted with sulfur trioxide to form an acid halide. This reaction is carried out at temperatures between about 50–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodine atoms by the well-known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins. Illustrative procedures are shown as follows:

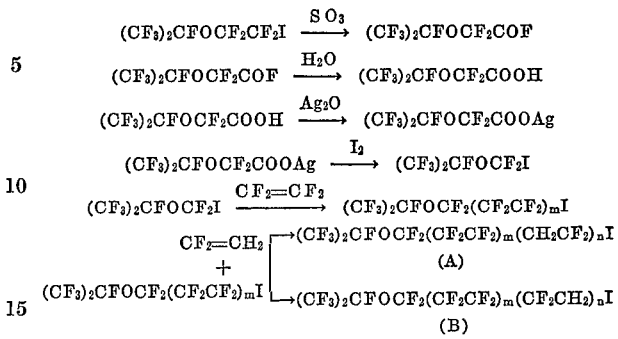

It should be noted that the above-noted telomerization reaction produces two products (A) and (B). The (A) product is obtained in about a 95% yield. The (B) product is obtained in about a 5% yield. The (A) and (B) products can be separated by conventional procedures. For example, dehydroiodinating the (A) and (B) product mixture with KOH at 75–150° C. preferentially converts product (A) to the corresponding olefin which can then be readily separated from product (B) by distillation.

For the special case where $m$ and $n$ are 0 and $p$ and $r$ are one, the iodide starting materials can be obtained by reacting a telogen of Formula III with $SO_3$, esterifying the resulting reaction products, reducing the ester to the alcohol with $LiAlH_4$ as reducing agent and reacting the alcohol with p-toluene sulfonyl chloride and metallic iodide to form the iodide containing one —$CF_2$— group and one —$CH_2$— group.

The telomerization reaction is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The use of such initiators allows operation at a lower temperature, but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated compound may be introduced into an autoclave which is then sealed and heated, preferably with agitation such as by stirring or shaking until the pressure drop indicates that alpha'-azobisisobutyronitrile and organic peroxides such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogen starting materials may be prepared by reaction of an appropriate halogenated ketone with an ionizable fluoride salt to form a fluorinated organic salt and then reacting the organic salt with a halogen other than fluorine (e.g., iodine, bromine) and an appropriate olefin to form the desired telogen. This reaction is more fully described in co-pending applications of Litt et al., Ser. No. 492,276, filed Oct. 1, 1965, now U.S. Pat. 3,453,333, and Litt et al., Ser. No. 513,574, filed Dec. 13, 1965, now U.S. Pat. 3,470,256, the pertinent subject matter of which is hereby incorporated by reference. For example, as is described in Examples 1 and 3 of the former application, the telogen perfluoroisopropoxyethyl iodide, $$(CF_3)_2CFOCF_2CF_2I,$$

may be prepared by reacting hexafluoroacetone with potassium fluoride in an acetonitrile solvent to produce the corresponding addition compound having the formula $(CF_3)_2CFO^-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

Compounds according to Formula II wherein $n$ is 0 may be obtained by telomerizing a telogen of Formula III with a telomerizable unsaturated compound. The telomerizable unsaturated compound may be the same or different from that used as reactant with the fluorinated organic salt and halogen in preparation of the telogen starting materials. Compounds according to Formula II wherein both $m$ and $n$ are 1 or over, may be obtained by reacting a suitable telogen with a first telomerizable unsaturated material to form a telomer and then reacting the telomer thus produced with a second telomerizable unsaturated material which may be the same or different as the first telomerizable unsaturated material.

As can be seen from the above description, the telomers produced can serve as telogens for further reactions. The term telogen will be used in this sense herein. In other words, the telogen may be a telomer product produced from the telogen, which telomer produced is further telomerizable.

Preferred telomerizable unsaturated materials are selected from the group consisting of $CF_2=CF_2$, $CF_2=CH_2$, $CF_2=CClF$, $CF_3CF=CF_2$ and $CH_2=CH_2$, which yield $(X_1X_2C-CX_3X_4)$ moieties of the formula $$-CF_2-CF_2-$$

$-CF_2CH_2-$, $-CF_2-CClF-$, $-CF_2-CF(CF_3)-$ and $-CH_2-CH_2-$, respectively. Other suitable telomerizable unsaturated materials include the following: $CCl_2=CH_2$, $CFH=CH_2$, $CClH=CH_2$, $CFH=CF_2$, $CFH=CFH$, $CClH=CClH$, $CF_2=CFBr$, $CF_2ClCF=CH_2$, $$CF_2CH=CF_2$$

$CF_3CCl=CF_2$, $(CF_3)_2C=CF_2$, $CF_3CF=CFCl$, $$CF_3CH=CFCl$$

$CFCl=CFCl$, $CF_3CF=CF_2$, $CF_2ClCF=CF_2$, $$CF_2BrCF=CF_2$$

$CF_3CF=CFCF_3$, $CHF=CFCFCl_2$, $CHF=CFCF_3$, $$CF_2=CF(CH_2)_6CH_3$$

$CF_2=CFCHClCH_3$, $CF_2=CHCF_2CH_3$, $$CF_2=CHCF_2CH_2Cl$$

$CH_2=CCF_3CF_2Br$, $CF_2=C(CF_3)CF_2(C_3H_7)$, $$CHCl=CFCF_3, CH_2=CClCF_2CH_3$$

Many more suitable telomerizable unsaturated compounds subject to the restrictions of the definition for the compounds of Formula I given above, will readily occur to one of ordinary skill in the art.

The quaternary ammonium compounds of the invention are prepared by reacting a corresponding amine with a suitable quaternizing agent to form the corresponding salts. The compounds are characterized by a positively charged nitrogen atom attached to a polyfluoroisoalkoxyalkylamine group; to a group contributed by the quaternizing agent which can be hydrogen, alkyl or the residue of a carboxylic acid or ester, and an accompanying anion, A, contributed by the quaternizing agent. In the case where a lactone or sultone is employed as the quaternizing agent, the positively charged nitrogen atom is attached to a negatively charged group to form a compound having an inner salt structure.

Quaternizing agents are well known and conventional and include for example alkyl halides, haloacids and esters, alkyl sulfates, sultones, β-lactones, mineral acids and organic acids. The structure of the compounds of the invention will vary somewhat depending on the nature of the quaternizing agent. For example, when an amine of Formula I, wherein $t$ is 0, is reacted with an alkyl halide, such as methyl iodide, the resultant compound has the formula:

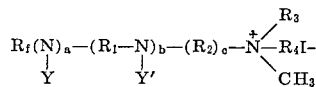

When a compound of Formula I is reacted with a mineral acid, such as hydrochloric acid, the resultant compound has the formula

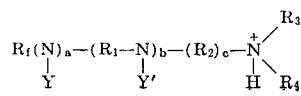

When a compound of Formula I is reacted with a β-lactone, such as β-propiolactone, the resultant compound has the formula

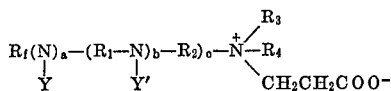

When a compound of Formula I is reacted with an excess of a compound giving a divalent anion such as dimethyl sulfate, the resultant compound has the formula

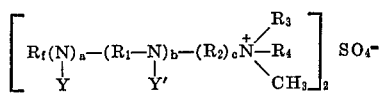

Suitable quaternizing agents include alkyl halides such as methyl iodide, methyl bromide, ethyl chloride and the like; haloacids such as chloroacetic acid, chloropropionic acid, chlorosuccinic acid and the like; haloacid esters such as chloroethyl acrylate and the like; alkyl sulfates such as dimethyl sulfate, diethyl sulfate and the like; sultones such as γ-propane sultone, σ-butane sultone and the like; β-lactones such as β-propiolactone and the like; mineral acids such as hydrochloric acid, hydroiodic acid, hydrofluoric acid, phosphoric acid and the like; organic acids such as acetic acid, succinic acid, benzoic acid and the like. Although a stoichiometric amount of the quaternary agent or acid is required for complete reaction, generally an excess will be employed. Preferably the accompanying anion is a halide, sulfate, phosphate, alkyl sulfonate of 1–6 carbon atoms or aryl sulfonate of 6–9 carbon atoms.

The quaternization reaction can be carried out in the presence or absence of an inert solvent. Suitable solvents are diethyl ether, acetonitrile, dimethylformamide, N-methylpyrrolidone and the like.

The temperature of the reaction is not critical. When the polyfluoroisoalkoxyalkanamides are reacted with strong acids, such as hydrochloric acid, or a reactive quaternizing agent, such as methyl iodide, the reaction proceeds readily at ambient temperatures. When less reactive quaternizing agents are employed, such as chloroacetic acid, higher temperatures of about 100–150° C. are preferred to increase the rate of reaction.

The resultant quaternary ammonium compounds are frequently obtained as solids when an inert solvent is employed. They can be readily separated, washed and dried. The products can be isolated from solution by addition of a nonsolvent, as will be known to one skilled in the art. The products can be employed as obtained or can be further purified if desired by recrystallization from an appropriate solvent or solvent mixture. Products obtained as viscous liquids can be further purified if desired by recrystallization from an appropriate solvent or solvent mixture. Products obtained as viscous liquids can be further purified by extraction with a suitable solvent.

DESCRIPTION OF THE PREFERRED EMBODIMENTS

A preferred class of amines and quaternary ammonium salts within the scope of the invention has the formula

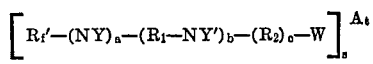 (IV)

wherein Y, Y', $R_1$, $R_2$, W, A, a, b, c, s, and t are as defined above and $R_f'$ is a polyfluoroisoalkoxyalkyl radical of the formula

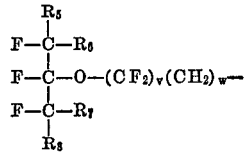

wherein $R_5$–$R_8$ are as defined above and v and w are integers from 1–20, preferably from 1–12.

The preferred class of amines and quaternary ammonium salts may be prepared by one or more of the aforementioned methods of preparation. As to aforementioned method (4), wherein a polyfluoroisoalkoxyalkyl sulfonate is reacted with a polyamine, the corresponding alcohol from which the sulfonate is prepared may in turn be prepared from iodides by methods which will vary depending upon the values of v and w in the preferred embodiment.

When v in Formula IV is an odd integer from 1–19 and w is 1, an alkyl iodide wherein v is 2–20 and w is 0 can be reacted with $SO_3$ to form a mixture of the acyl halide and perhaloalkoxyfluoroalkyl pyrosulfuryl fluoride; this mixture can be reacted with an alcohol to form the ester; and the ester can be reduced to the desired alcohol with $LiAlH_4$.

Where v in Formula IV is an even integer from 2–20 and w is 1, an iodide having two terminal —$CH_2$— groups can be reacted with alcoholic KOH to form an ethene; the ethene can be oxidized with $KMnO_4$ to an acid; the acid can be esterified with an alkanol; and the ester can be reduced to the desired alcohol with $LiAlH_4$.

When v in Formula IV is an even integer from 2–20, and w is odd or even from 3–20, the appropriate fluoro iodide can be reacted with an unsaturated alkanol of the formula $CH_2=CH(CH_2)_{y-2}OH$ to form the corresponding iodo alcohol which can be reduced to the desired alcohol with zinc and an alkanol.

When v in Formula IV is an even integer from 2–20 and w is 1–3, the iodide can be reacted with $SO_3$ to form the pyrosulfate or with oleum to form the hydrosulfate; and the pyrosulfate or hydrosulfate can be hydrolyzed with aqueous acid to form the desired alcohol.

When v in Formula IV is an odd integer from 1 to 19 and w is an odd or even integer from 2 to 20, the iodide can be reacted to form an acid having an odd number of —$CF_2$— groups, the acid can be reacted with silver oxide to form a perhaloisoalkoxyperfluoroalkyl iodide; the iodide can be reacted with an unsaturated alcohol such as allyl alcohol, and the resultant iodoalcohol can be reduced to the desired alcohol with zinc and an alkanol.

The polyfluoroisoalkoxyalkyl alcohols and methods of preparing them are described in greater detail in copending application of Anello et al., Ser. No. 721,089, filed Apr. 12, 1968. Mixtures of more than one alcohol can be employed in the invention.

Specific examples of embodiments of the novel compound of the invention as defined by both Formula I and Formula IV include the following:

(1)

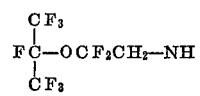

(2)

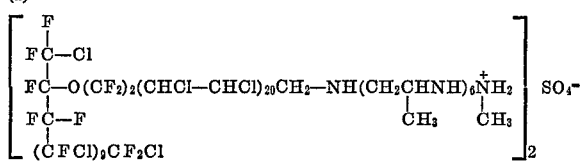

(3)
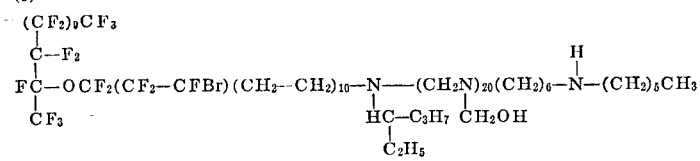

(4)
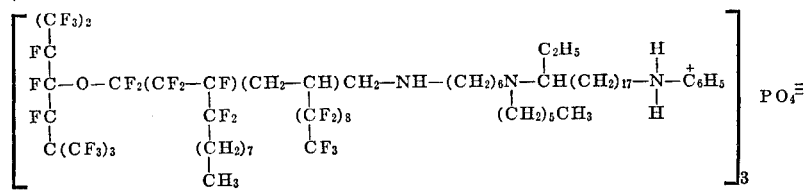

(5)
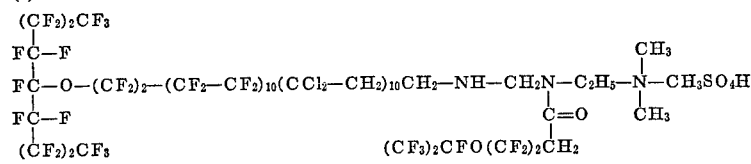

(6)
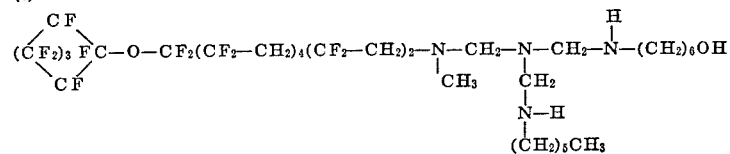

(7)
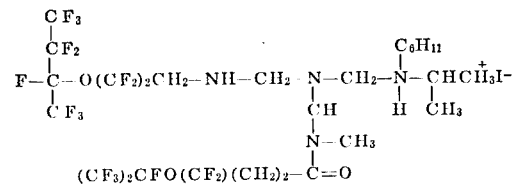

(8) 

(9)
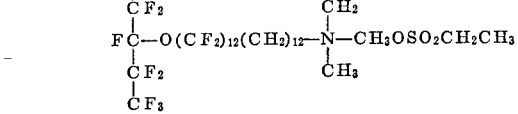

(10) $(CF_3)_2CFO(CF_2)_3(CH_2)_2-N\begin{smallmatrix}-CH_3^+\\ \\ CH_2CH_3COO^-\end{smallmatrix}$

(11) 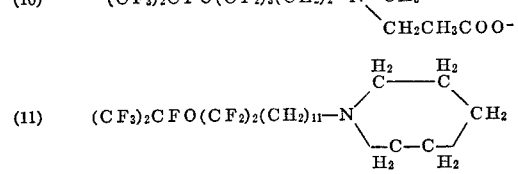

The invention can be more fully understood by reference to the following examples. All analyses are in percent by weight.

EXAMPLE 1

A flask was charged with 200 ml. of anhydrous diethyl ether and then with 16 g. (0.43 mole) of $LiAlH_4$. To the solution was added dropwise 97 g. (0.285 mole) of $(CF_3)_2CFOCF_2CF_2(CH_2)_3CN$ dissolved in 100 ml. diethyl ether, the addition being made slowly enough to maintain a gentle reflux. Stirring was continued for 5 hours. At the end of the reflux period, the flask was cooled, and dilute sulfuric acid was added to decompose the excess $LiAlH_4$. A 50% solution of sodium hydroxide was then added until the resulting solution became basic (pH of 11 by Hydrion paper). The mixture was poured into a separatory funnel and the upper ether phase was separated from the lower aqueous phase. The aqueous phase was further extracted with ether; the ethereal extracts were combined, dried with $MgSO_4$, and distilled. There were recovered 52 g. (0.15 mole, 52.5% yield) of desired $(CF_3)_2CFOCF_2CF_2(CH_2)_3NH_2$ having a boiling point of 75–78° C./60 mm. The infrared spectrum shows the —NH group at 2.86–3.03μ.

Elemental analysis of the product showed the following comparison with theoretically calculated values for $C_8F_{11}H_8ON$:

Calculated (percent): C, 27.98; F, 60.94; H, 2.33; N, 4.08. Found (percent): C, 27.80; F, 60.97; H, 2.29; N, 4.18.

EXAMPLE 2

Dry hydrogen chloride gas was added to a 50 ml. ether solution of 23 g. (0.068 mole) of $(CF_3)_2CFOCF_2CF_2(CH_2)_3NH_2$ until the gas was no longer absorbed. The white product was collected by filtration. A quantitative yield of $(CF_3)_2CFOCF_2CF_2(CH_2)_3NH_2$ HCl was obtained having a melting point of 126–128° C.

Elemental analysis of the product showed the following comparison with theoretically calculated values for $C_8F_{11}H_9ClON$:

Calculated (percent): C, 25.29; F, 55.72; H, 2.37; N, 9.35. Found (percent): C, 25.82; F, 56.04; H, 2.47; N, 9.46.

EXAMPLE 3

A flask was charged with 200 ml. of diethyl ether and 9.3 g. (0.25 mole) of $LiAlH_4$. To this solution was slowly added 145 g. (0.33 mole) of $$(CF_3)_2CFO(CF_2CF_2)_2CH_2CH_2CN$$

in 100 ml. of ether, maintaining the temperature at 35° C. Stirring was continued overnight after which the solution was cooled and treated as in Example 1. There was recovered 33 g. (0.075 mole, 30% yield) of desired $(CF_3)_2CFO(CF_2CF_2)_2(CH_2)_3NH_2$ having a boiling point of 72–74° C./10 mm. The infrared spectrum shows the —$NH_2$ group at 2.86–3.03µ.

Elemental analysis of the product showed the following comparison with theoretically calculated values for $C_{10}F_{15}H_8ON$:

Calculated (percent): C, 30.08; F, 64.33; H, 1.81; N, 3.16. Found (percent): C, 30.06; F, 64.12; H, 2.01; N, 3.62.

EXAMPLE 4

Dry hydrogen chloride was passed into a 50 ml. ether solution of 7.7 g. (0.017 mole) of $$(CF_2)_2CFO(CF_2CF_2)(CH_2)_3NH_2$$

for three hours. A 94% yield of $$(CF_3)_2CFO(CF_2CF_2)_2(CH_2)_3NH_2HCl$$

was obtained having a melting point of 175–177° C.

Elemental analysis of the product showed the following comparison with theoretically calculated values for $C_{10}F_{15}H_9ClON$:

Calculated (percent): C, 25.03; F, 59.44; H, 1.87; N, 7.39. Found (percent): C, 25.42; F, 59.36; H, 1.92; N, 7.57.

EXAMPLE 5

A mixture of 116.5 g. (0.25 mole) of $$(CF_3)_2CFOCF_2CF_2CH_2CH_2OSO_2C_6H_5$$

and 125 g. (2.5 moles) of $H_2N \cdot NH_2 \cdot H_2O$ was slowly heated to reflux (113° C.) and maintained at this temperature for 64 hours with vigorous agitation. The heavy oily layer was separated dried and distilled. There was recovered 73.5 g. (0.215 mole) of $$(CF_3)_2CFOCF_2CF_2CH_2CH_2NHNH_2$$

having a boiling point of 76–78° C./20 mm. The infrared spectrum shows the —$NHNH_2$ group at 2.95µ.

Elemental analysis of the product showed the following comparison with theoretically calculated values for $C_7F_{11}H_7ON$:

Calculated (percent): C, 24.41; F, 60.55; H, 2.03; N, 8.14. Found (percent): C, 24.32; F, 61.02; H, 2.12; N, 8.01.

EXAMPLE 6

Dry hydrogen chloride was passed into a 60 ml. ether solution of 11.7 g. (0.034 mole) of $$(CF_3)_2CFOCF_2CF_2CH_2CH_2NHNH_2$$

for three hours. A 90% yield of $$(CF_3)_2CFOCF_2CF_2CH_2CH_2NHNH_2 \cdot HCl$$

was obtained having a melting point of 145–146° C.

Elemental analysis of the product showed the following comparison with theoretically calculated values for $C_7F_{11}H_3ClON_2$:

Calculated (percent): C, 22.07; F, 54.90; H, 2.10; N, 9.33. Found (percent): C, 22.15; F, 55.61; H, 2.06; N, 9.55.

EXAMPLE 7

Ten grams (0.014 mole) of $$[(CF_3)_2CFOCF_2CF_2CH_2CH_2O]_2SO_2$$

was slowly added to 6 g. (0.082 mole) of $(C_2H_5)_2NH$ over a half-hour period. After a slight exotherm to 40° C., the mixture was further heated to 60° C. for 2 hours. Distillation gave 5 g. (0.013 mole) of $$(CF_3)_2CFOCF_2CF_2CH_2CH_2N(C_2H_5)_2$$

boiling point 65–67° C./19 mm., and 6.2 g. (0.013 mole) of $(CF_2)_2CFOCF_2CF_2CH_2CH_2OSO_2NH_2(C_2H_5)_2$ as a high boiler.

Elemental analysis of the product showed the following comparison with theoretically calculated values for $$C_{11}F_{11}H_{14}NO$$

Calculated (percent): C, 34.19; F, 54.14; H, 3.90; N, 3.64. Found (percent): C, 34.87; F, 52.30; H, 3.70; N, 3.48.

EXAMPLE 8

Forty-four grams (0.055 mole) of $$[(CF_3)_2CFOCF_2CF_2CH_2CH_2O]SO_2$$

was slowly added to 20 g. of (0.275 mole) of $(CH_5)_2NH$ over a half-hour period. After an exotherm to 60° C., the mixture was heated to 70° C. for 2 hours. Distillation gave 10.5 g. (0.0272 mole) of $$(CF_3)_2CFOCF_2CF_2CH_2CH_2N(C_2H_5)_2$$

having a boiling point of 65–67° C./19 mm.

EXAMPLE 9

Into a stoppered Erlenmeyer flask was placed 5 g. (0.013 mole) of $(CF_3)_2CFOCF_2CF_2CH_2CH_2N(C_2H_5)$, 2.5 g. (0.017 mole) of methyl iodide and 2 g. of anhydrous diethyl ether. The mixture was gently swirled and set aside for 24 hours. Crystals of product appeared within 2 hours and complete solidification within the 24 hours. There was recovered 6.6 g. (0.0125 mole) of $$(CF_3)_2CFOCF_2CF_2CH_2CH_2N(C_2H_5)_2CH_3I$$

having a melting point of 181–185° C.

Elemental analysis of the product showed the following comparison with theoretically calculated values for $$C_{12}F_{11}H_{17}ION$$

Calculated (percent): C, 27.32; F, 39.66; H, 24.09; N, 3.22. Found (percent): C, 28.12; F, 40.15; H, 23.86; N, 3.51.

EXAMPLE 10

Thirty grams (0.0325 mole) of $$[(CF_3)_2CFO(CF_2CF_2)_2CH_2CH_2O]_2\!-\!SO_2$$

was rapidly added to 19 g. of (0.26 mole) of diethyl amine. After a slight exotherm to 30° C., the mixture was further heated to 60° C. for 2 hours. Distillation gave 16 g. (0.22 mole) of unreacted diethyl amine, 18 g. (0.037 mole) of $$(CF_3)_2CFO(CF_2CF_2)_2CH_2CH_2N(C_2H_5)_2$$

having a boiling point of B.P. 84–85° C./15 mm.

Elemental analysis of the product showed the following comparison with theoretically calculated values for $$C_{13}F_{15}H_{14}ON$$

Calculated (percent): C, 32.17; F, 59.17; H, 2.91; N, 2.91. Found (percent): C, 31.98; F, 59.45; H, 3.01; N, 2.85.

EXAMPLE 11

A mixture of 68.5 g. (0.145 mole) of $$(CF_3)_2CFOCF_2CF_2CH_2CH_2OSO_2C_6H_5$$

and 100 g. (1.67 moles) of ethylene diamine was slowly heated to 100° C. for 5 hours. The heavy oil layer was separated, dried and distilled. There was recovered 30 g. (0.08 mole) of $(CF_3)_2CFOCF_2CF_2CH_2CH_2NHCH_2CH_2NH_2$ having a boiling point of 85–89° C./15 mm. The infrared spectrum shows the —$NHCH_2CH_2NH_2$ group at 3.23μ.

Elemental analysis of the product showed the following comparison with theoretically calculated values for $C_9F_{11}H_{11}ON_2$ Calculated (percent): C, 29.06; F, 56.18; H, 2.96; N, 7.52. Found (percent): C, 29.42; F, 56.81; H, 2.81; N, 7.46.

EXAMPLE 12

A flask was charged with 200 ml. of diethyl ether and 5.5 g. (0.146 mole) of $LiAlH_4$. To this solution was slowly added 25 g. (0.066 mole) of $(CF_3)_2CFOCF_2CF_2CF_2CONH_2$ in 100 ml. of ether, maintaining the temperature at 35° C. Stirring was continued overnight after which the solution was cooled and treated as in Example 1. There was recovered 12 g. (0.033 mole, 50% yield) of desired $(CF_3)_2CFOCF_2CF_2CF_2CH_2NH_2$ having a boiling point of 117–119° C. The infrared spectrum shows a —$NH_2$ group at 2.86–3.03μ.

Elemental analysis of the product showed the following comparison with theoretically calculated values for $C_7F_{13}H_4N_6$ Calculated (percent): C, 23.01; F, 67.98; H, 1.09; N, 3.48. Found (percent): C, 23.23; F, 68.42; H, 1.21; N, 3.75.

EXAMPLE 13

A flask was charged with 200 ml. of diethyl ether and 6 g. (0.16 mole) of $LiAlH_4$. To this solution was slowly added 30 g. (0.062 mole) of $(CF_3)_2CFO(CF_2CF_2)CF_2CONH_2$ in 100 ml. of ether maintaining the reaction temperature at 35° C. Stirring was continued for six hours after which the solution was cooled and treated as in Example 1. There was recovered 16 g. (0.034 mole, 55% yield) of $(CF_3)_2CFO(CF_2CF_2)_2CF_2CH_2NH_2$ having a boiling point of 153–155° C.

Elemental analysis of the product showed the following comparison with theoretically calculated values for $C_9F_{17}H_4NO$ Calculated (percent): C, 23.25; F, 69.54; H, 0.86; N, 3.01. Found (percent) C, 23.52; F, 70.10; H, 0.94; N, 2.93.

EXAMPLE 14

The following table (Table I) lists illustrative perfluoroisoalkoxyalkyl substituted ammonium salts that have been prepared and shows the remarkable reduction in surface tension produced when a small amount is dissolved in water. All values were measured at 25° C. and are in dynes/cm.

TABLE I

Value without additive: 72.3

| Amount of additive (percent by wt.) | 1.0 | 0.5 | 0.1 |
|---|---|---|---|
| Additive compounds: | | | |
| $(CF_3)_2CFO(CF_2)_2(CH_2)_3NH_2 \cdot HCl$ | 20.0 | 24.2 | 34.3 |
| $(CF_3)_2CFO(CF_2)_4(CH_2)_3NH_2 \cdot HCl$ | 22.3 | 22.2 | 31.1 |
| $(CF_3)_2CFO(CF_2)_2(CH_2)_2N(C_2H_5)_2 \cdot CH_3I$ | 25.3 | 28.0 | 39.6 |

EXAMPLE 15

The salts were also tested as oil repellency agents for treating textiles. Samples of cotton print cloth were padded with 1% aqueous solutions of the fluorochemicals, squeezed to remove excess solution (100% wet pick-up), then dried at about 160° C. for 4 minutes.

The procedure employed in determining the oil repellency ratings is described, for example, on pp. 323–4 of the April 1962 edition of the "Textile Research Journal." This procedure involves gently placing on the treated fabric drops of mixtures of mineral oil and n-heptane in varying proportions. The drops are allowed to stand on the treated fabric undisturbed for 3 minutes, after which the wetting and penetration of the fabric is visually observed. The number corresponding to the mixture containing the highest percentage of heptane which does not penetrate or wet the fabric is considered to be the oil repellency rating of the treated fabric. The results are shown in Table II below. The compounds show good oil repellent effects.

TABLE II

| Compound: | Oil repellency |
|---|---|
| $(CF_3)_2CFO(CF_2)_2(CH_2)_2NH_2 \cdot HCl$ | 90 |
| $(CF_3)_2CFO(CF_2)_4(CH_2)_3NH_2 \cdot HCl$ | 90 |
| $(CF_3)_2CFO(CF_2)_2(CH_2)_2NHNH_2 \cdot HCl$ | 90 |

We claim:
1. A compound of the formula

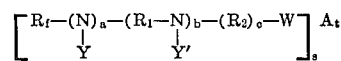

wherein (a) $R_f$ is a polyfluoroisoalkoxyalkyl radical of the formula

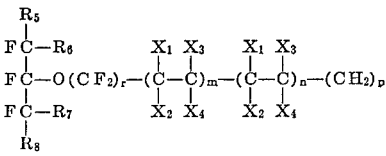

wherein (i) $R_5$–$R_8$ can be independently selected from the group consisting of fluorine, chlorine, and perhaloalkyl groups of 1 to 10 carbon atoms, the halo portions of $R_5$–$R_8$ being fluorine or chlorine with the provisos that each carbon atom of $R_5$–$R_8$ contain at least one fluorine atom, no more than three of $R_5$–$R_8$ are haloalkyl groups, $R_5$ and $R_6$ cannot both be chlorine and $R_7$ and $R_8$ cannot both be chlorine;

(ii) $X_1$–$X_4$ independently can be hydrogen, fluorine, chlorine or bromine, provided that each $X_1$–$X_4$ group do not include more than two chlorine atoms or one bromine atom, and when $X_1$ and $X_3$ independently are each hydrogen or fluorine, each of $X_2$ and $X_4$ independently may be $CF_2R_9$ wherein $R_9$ is an alkyl or haloalkyl radical of 1 to 8 carbon atoms in which the halogen atoms are fluorine, chlorine or bromine, the $(X_1X_2C—CX_3X_4)_m$ and $(X_1X_2C—CX_3X_4)_n$ moieties may be the same or different;

(iii) $r$ is an integer from 1–2, $m$ and $n$ are integers from 0–20, the sum of $m$ and $n$ is 0–20, $p$ is an integer from 0–1; with the proviso that when $p$ is 0, $n$ must be at least one and $X_3$ and $X_4$ in the $(X_1X_2C—CX_3X_4)_n$ moiety must be hydrogen;

(b) $R_1$ independently at each occurrence is an alkylene group, straight chain or branched, of 1–6 carbon atoms;

(c) $R_2$ is an alkylene group, straight chain or branched, of 1–20 carbon atoms;

(d) Y can be hydrogen or an alkyl of 1–6 carbon atoms;

(e) Y' independently at each occurrence can be hydrogen, alkyl or hydroxyalkyl of 1–6 carbon atoms, or

wherein $R_1$ and Y have the aforesaid meanings and B can be hydrogen, or alkyl of 1–6 carbon atoms;

(f) W is an amine radical of the formula

wherein $R_3$ and $R_4$ independently can be selected from the group consisting of hydrogen, alkyl of 1–6 carbon atoms, and hydroxyalkyl of 1–6 carbon atoms, or W is an ammonium salt radical of the formula

wherein $R_3$ and $R_4$ have the aforesaid meanings;

(g) A is an accompanying anion;

(h) $a$ and $c$ are integers from 0–1 and $b$ is an integer from 0–20, with the proviso that when $a$ is 0, $b$ and $c$ are 0; $t$ is an integer from 0–1 and $s$ is an integer from 1–3 with the proviso that when W is an amine radical, $t$ is 0 and $s$ is one, and when W is an ammonium salt radical, $t$ is one and $s$ is an integer from one up to the negative charge of A.

2. A compound according to claim 1 wherein $m$ and $n$ are integers from 0–10.

3. The compound according to claim 2 wherein $b$ is an integer from 0–6 and $R_2$ has 1–6 carbon atoms.

4. A compound according to claim 3 wherein $X_1$–$X_4$ are hydrogen, fluorine or chlorine.

5. A compound according to claim 4 wherein the —($X_1X_2$C—C$X_2X_4$)— moieties are idependently selected from the group consisting of —CF$_2$—CF$_2$—,

—CF$_2$—CH$_2$—,

—CF$_2$—CClF—, and —CH$_2$CH$_2$—.

6. A compound according to claim 5 wherein $R_5$–$R_8$ independently are fluorine or perfluoroalkyl groups of 1–3 carbon atoms and $R_3$ and $R_4$ are hydrogen or alkyl of 1–6 carbon atoms.

7. A compound according to claim 6 wherein A is an anion selected from the group consisting of halide anion, sulfate anion, phosphate anion, alkyl sulfate anion of 1–6 carbon atoms and aryl sulfonate sulfate anion.

8. A compound according to claim 7 wherein A is a halide anion.

9. A compound according to claim 1 wherein $R_f$ is $R_f'$ and $R_f'$ has the formula

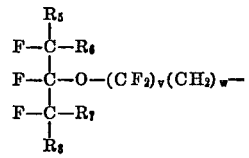

wherein v and w are integers from 1–20.

10. A compound according to claim 9 wherein $b$ is an integer from 0–6 and $R_2$ has 1–6 carbon atoms.

11. A compound according to claim 10 wherein $R_5$–$R_8$ independently are fluorine or perfluoroalkyl groups of 1–3 carbon atoms and $R_3$ and $R_4$ are hydrogen or alkyl of 1–6 carbon atoms.

12. A compound according to claim 11 wherein A is an anion selected from the group consisting of halide anion, sulfate anion, phosphate anion, alkyl sulfonate anion of 1–6 carbon atoms and aryl sulfonate of 6–9 carbon atoms.

13. A compound according to claim 12 wherein v and w are integers from 1–12.

14. A compound according to claim 13 wherein $R_5$–$R_8$ are fluorine.

15. A compound according to claim 14 wherein A is a halide anion.

16. A compound according to claim 15 wherein A is a chloride anion.

17. A compound according to claim 14 of the formula (CF$_3$)$_2$CFO(CF$_2$)$_2$(CH$_2$)$_3$NH$_2$.

18. A compound according to claim 14 of the formula (CF$_3$)$_2$CFO(CF$_2$)$_4$(CH$_2$)$_3$NH$_2$.

19. A compound according to claim 14 of the formula (CF$_3$)$_2$CFO(CF$_2$)$_6$(CH$_2$)$_3$NH$_2$.

20. A compound according to claim 14 of the formula (CF$_3$)$_2$CFO(CF$_2$)$_8$(CH$_2$)$_3$NH$_2$.

References Cited

UNITED STATES PATENTS 3,194,840    7/1965    Berry _____ 260—583

$^1$b_9GRr8R

OTHER REFERENCES

Englin et al.: Index Chemicus, vol. 33, 1969, No. 111,095.

LEWIS GOTTS, Primary Examiner

C. F. WARREN, Assistant Examiner

U.S. Cl. X.R.

8—147; 117—143, 137; 252—8.1, 8.8, 357, 358; 260— 293.87, 326.85, 458, 465.6, 501.13, 501.21, 513 R, 535 H, 561 R, 561 HL, 563 R, 563 C, 563 P, 567.6, 570.5 P, 573, 574, 584 R, 601 H, 614 F, 615 BF